(12) United States Patent
Holzer

(10) Patent No.: US 7,038,464 B2
(45) Date of Patent: May 2, 2006

(54) CARRIER LINE ORIENTED SPIN HIGH VOLTAGE LEAK DETECTION SYSTEM AND METHOD

(75) Inventor: Francis J. Holzer, Wheeling, IL (US)

(73) Assignee: Diamond Machine Werks, Inc., Elk Grove, IL (US)

( * ) Notice: Subject to any disclaimer, the term of this patent is extended or adjusted under 35 U.S.C. 154(b) by 0 days.

(21) Appl. No.: 10/926,618

(22) Filed: Aug. 26, 2004

(65) Prior Publication Data

US 2006/0042357 A1 Mar. 2, 2006

(51) Int. Cl.
*G01N 27/00* (2006.01)
*G01N 27/62* (2006.01)

(52) U.S. Cl. ...................... 324/558; 324/456
(58) Field of Classification Search ................ 324/536, 324/557, 558, 456, 460
See application file for complete search history.

(56) References Cited

U.S. PATENT DOCUMENTS

| | | | | |
|---|---|---|---|---|
| 4,125,805 A | * | 11/1978 | Nagamatsu et al. | 324/558 |
| 4,864,848 A | * | 9/1989 | Irvine | 73/45.4 |
| 4,914,395 A | * | 4/1990 | Hamada | 324/557 |
| 5,200,801 A | | 4/1993 | Juvinall | 356/428 |
| 5,404,227 A | | 4/1995 | Sumita | 356/428 |
| 5,510,718 A | * | 4/1996 | Enderby | 324/536 |
| 5,535,618 A | | 7/1996 | Konieczka | 73/493 |
| 5,719,679 A | | 2/1998 | Shimizu | 356/428 |
| 6,009,744 A | | 1/2000 | Kovalchick | 73/40 |
| 6,293,387 B1 | | 9/2001 | Forster | 198/377.02 |
| 6,427,524 B1 | | 8/2002 | Raspante | 73/45.4 |
| 6,473,169 B1 | | 10/2002 | Dawley | 356/239.4 |
| 2005/0115305 A1 | * | 6/2005 | Nothhelfer et al. | 73/41 |

OTHER PUBLICATIONS

Nikka Densok U.S.A., Inc., High Voltage Leak Detection (HVLD), informational article, undated but circa 2002, 9 sheets, Published in the U.S.A.
Nikka Densok Limited, Pinhole Inspector HDB-II-AS3 Easy Operation with Touch Screen, informational brochure, undated but circa 2002, 4 pages, Published in the U.S.A..

\* cited by examiner

*Primary Examiner*—Anjan Deb
(74) *Attorney, Agent, or Firm*—James P. Hanrath

(57) ABSTRACT

Inspection and leak detection of electrically insulated containers having an electrically conductive solution therein in high speed assembly carrier line systems, includes controlled carrier structure and methods for carrying, conveying, orientating, and spinning the containers in a desired line of travel for high frequency high voltage spark testing workstation processing. A plurality of carriers convey the containers along a pathway to a particular orientation relative to a high voltage leak detection system to obtain an electric current volume reading. The carriers are orientated so as to dispose the conductive solution along a longitudinal axis of the containers in contact with a longitudinal portion of an internal circumference of the containers, to expose a portion of an external circumference of the containers to the inspection electrode of a high voltage leak detection system, and to expose a portion of an external surface of the containers to a detection electrode of a high voltage leak detection system. While so orientated, the containers are then spun by a rotating roller or belt in abutment with the containers to expose successive longitudinal portions of said internal circumference of the containers in contact with the conductive solution of the containers for electric current volume reading by the high voltage leak detection system.

22 Claims, 8 Drawing Sheets

CARRIER LINE ORIENTED SPIN HIGH VOLTAGE LEAK DETECTION SYSTEM AND METHOD

BACKGROUND OF THE INVENTION

1. Field of the Invention

The present invention relates generally to quality control inspection and leak detection of product work piece electrically insulated containers having an electrically conductive solution therein in high speed assembly carrier line systems, particularly to controlled carrier means and methods for carrying, conveying, orientating, and spinning the product work piece containers in a desired line of travel for high frequency high voltage spark testing workstation processing.

2. Description of the Related Art

When carrier system work pieces, such as plastic bottles, liquid containers, glass vials, and ampoules, are manufactured, they are tested to ensure that no holes or leaks are formed therein.

In many industries, it is important to test the fluid tightness and seal integrity of containers. For example, in the food industry, it is essential to ensure that containers in which food products are packed are completely sealed to ensure that the contents are a good condition, free from molds, bacteria and other pathogenic organisms, so they will be safe when used by consumers. The pharmaceutical industry similarly requires that containers for medicines, especially solutions intended for injection or intravenous administration, be protected from contamination or serious danger to public health may result.

Thus, the detection of pinholes, hairline cracks, and defective seals in assembly line product containers is important to the quality control of the product, especially in production environment of varying temperatures. For example, at higher temperatures the solution or product may expand and leak from a pinhole, a crack or defective seal of a container, and at lower temperatures the product can shrink back into the container bringing within such contaminants as bacteria from the exterior of the container.

In the past several approaches have been employed to ascertain the fluid tightness and seal security of containers apart from visual inspection. For example, some test devices use a positive pressure approach wherein an active force on the container is created so as to enable the detection of a substantial movement of a wall of the container which movement is monitored and translated into a leak detection function. Exemplary of such devices are U.S. Pat. Nos. 4,663,964 and 4,771,630 and 5,226,316.

Other testing approaches include optical scanning techniques for inspecting containers for variations that affect optical characteristics of the container. Exemplary of such devices are U.S. Pat. Nos. 4,378,493, 4,584,469, 5,200,801 and 5,719,679. In U.S. Pat. No. 5,719,679 to Shimizu et al. there is disclosed a method and apparatus for inspecting a medicine vial with cameras in the course of conveying the vial by a rotary table, comprising the steps of inspecting the vial's lower half at a station of the vial's lower portion while the vial is rotated from above with its head being chucked, inspecting the vials upper half at a station of the vial's upper portion while the vial is supported and rotated from below by a rotary belt adapted to be brought into contact with the vial, and combining these inspections of lower and upper halves to inspect the whole vial from its head to its bottom.

While the foregoing inspection and detection systems have met with limited success, such systems require complex machinery or multiple workstation processing that are time-consuming and inefficient, especially when the system requires a high-speed detection of several hundred containers per minute. Further such systems, particularly those employing vacuum or pressure decay tests, may be destructive causing the loss of good product and packaging components.

An alternative to the foregoing is a system that employs a high frequency high voltage spark test method of inspection. In high voltage leak detection systems, the conductive solution in the container is used as an electric circuit pathway such that small pinholes or hairline cracks or capillary pores which would normally be dosed by the product will be more consistently and effectively detected while reducing the possibility of false rejections. Such systems rely upon the increase in the current volume through the product to determine whether the container is defective (namely, leakage current will be greater than charging current when the container workpiece has a leak and when there is no leak, the container functions as an insulator and the charging current will be greater than the leakage current). Exemplary of such a system is U.S. Pat. No. 6,009,744, the entire disclosure of which is hereby incorporated by reference herein. Further, a high frequency high voltage spark test method of inspection is preferable because it can detect even the smallest pinhole, hair crack, capillary pore or insufficient container wall thickness when the high voltage electrical currents "wash" the container. Pinholes as small as 0.5 microns in diameter can be consistently detected.

However, high frequency high voltage spark test methods of container inspection must rely upon the electrical conductivity of the container solution to obtain electric current circuit readings by an inspection electrode and a cooperative detection electrode that are exposed to the container in a manner avoiding any air pocket or air bubble of the container's interior. Thus, reliable testing of containers in high-speed carrier assembly lines has required multiple arrays of inspection electrodes being exposed to varying multiple positions of the container. For example, a vertically orientated container may have an air pocket in container's upper interior bordering the container's neck and cap in which case the inspection electrode and cooperative detection electrode cannot be exposed adjacent the air pocket. For complete reliable testing of such a container, a first high voltage leak detection test would be directed to the containers lower portion and a second high voltage leak detection test using a repositioned container and a repositioned set of the inspection and detection electrodes would be undertaken to inspect the container's upper portion at a point in time when the air pocket has shifted leaving the electrically conductive solution to close any pinhole, hair crack, capillary pore or deficient wall thickness in the upper portion.

In addition to air pockets within a container, many high voltage spark test leak detection systems are not readily adapted to accommodate rapid, repetitive assembly line processing of carrier borne products or work pieces presented to multiple machine or station operations which require differing specific orientations of the product or work pieces at selected points of the overall assembly line processing procedure.

In U.S. Pat. No. 6,293,387 to Forster there is disclosed a carrier, a carrier orientation and conveying structure, a carrier line system assembly, and a carrier process for orientating and conveying containers to be transported along a desired pathway wherein the pathway has a guide element cooperative with the carrier selected from one of more of the group consisting of a rail for engagement into a transverse slot of the carrier, a rod for engagement into a transverse bore of the carrier, and a boundary barrier to contain the carriers. When the guide element of the pathway includes a cam rail surface upon the rod, selected controlled rotational movement of the carrier circumferentially upon the rod perpendicular to its ongoing lineal path along at least a portion of the length of the rod is achieved. The entirety of U.S. Pat. No. 6,293,387 to Forster is hereby incorporated by reference herein for its disclosure of a carrier, a carrier orientation and conveying structure, a carrier line system assembly, and a carrier process for orientating and conveying containers to be transported along a desired pathway.

SUMMARY OF THE INVENTION

In accordance with the present invention there is provided a method for assembly line pathway high voltage spark test leak detection inspection of electrically insulated containers having an electrically conductive solution therein, the containers being merged with complimentary assembly line carriers, comprising the steps of: (a) conveying a plurality of carriers upon an assembly line pathway to transport the containers to a high voltage spark test leak detection inspection system workstation, (b) orientating the containers at the workstation so as to dispose the solution along a longitudinal axis of the containers in contact with a longitudinal portion of an internal circumference of the containers, to expose a portion of an external circumference of the containers to an inspection electrode of a high voltage spark test leak detection system, and to expose a portion of an external surface of the containers to a detection electrode of a high voltage spark test leak detection system, and (c) spinning the containers while so orientated to expose successive longitudinal portions of the internal circumference of the containers in contact with the electrically conductive solution of the containers for electric current volume reading by the high voltage spark test leak detection system.

The present invention also provides for a carrier line orientated spin high voltage spark test leak detection assembly in which carriers are conveyed, in use, to a high voltage spark test leak detection system workstation in order to perform testing on electrically insulated containers having a conductive solution therein merged with the carriers. The assembly comprises a plurality of carriers for conveying the containers, a pathway having a guide element cooperative with the carriers, drive means for moving the carriers along the pathway to the high voltage spark test leak detection system workstation, a high voltage spark test leak detection system having an inspection electrode and a detection electrode operatively cooperative with the containers at the workstation to obtain an electric current volume reading, means for orientating the carriers at the workstation to dispose the solution along a longitudinal axis of the containers in contact with a longitudinal portion of an internal circumference of the containers, to expose a portion of an external circumference of the containers to the inspection electrode of the high voltage spark test leak detection system, and to expose a portion of an external surface of the containers to the detection electrode of the high voltage spark test leak detection system, and means for spinning the containers while so orientated to expose successive longitudinal portions of the internal circumference of the containers in contact with the electrically conductive solution of the containers for electric current volume reading by the high voltage spark test leak detection system.

The present invention advantageously provides for high speed assembly line carriers merged with work piece containers to be conveyed to a high voltage spark test leak detection inspection system workstation where the container is disposed in a substantially horizontal orientation and spun so as to expose successive portions of the container's longitudinal underside surface to an inspection electrode or an array of inspection electrodes located underneath the same. In this way, regardless of any air pocket at the upper interior of the container, the container's electrically conductive solution is disposed along a consistent longitudinal interior axis of the container in contact, during the spin, with successive longitudinal portions of the interior circumference of the container to allow electric current volume inspection for the detection of pinholes, hairline cracks, capillary pores, or deficient seals throughout the container's interior circumference dosed by the solution during the spin.

DESCRIPTION OF THE PREFERRED EMBODIMENTS

Figure 1:
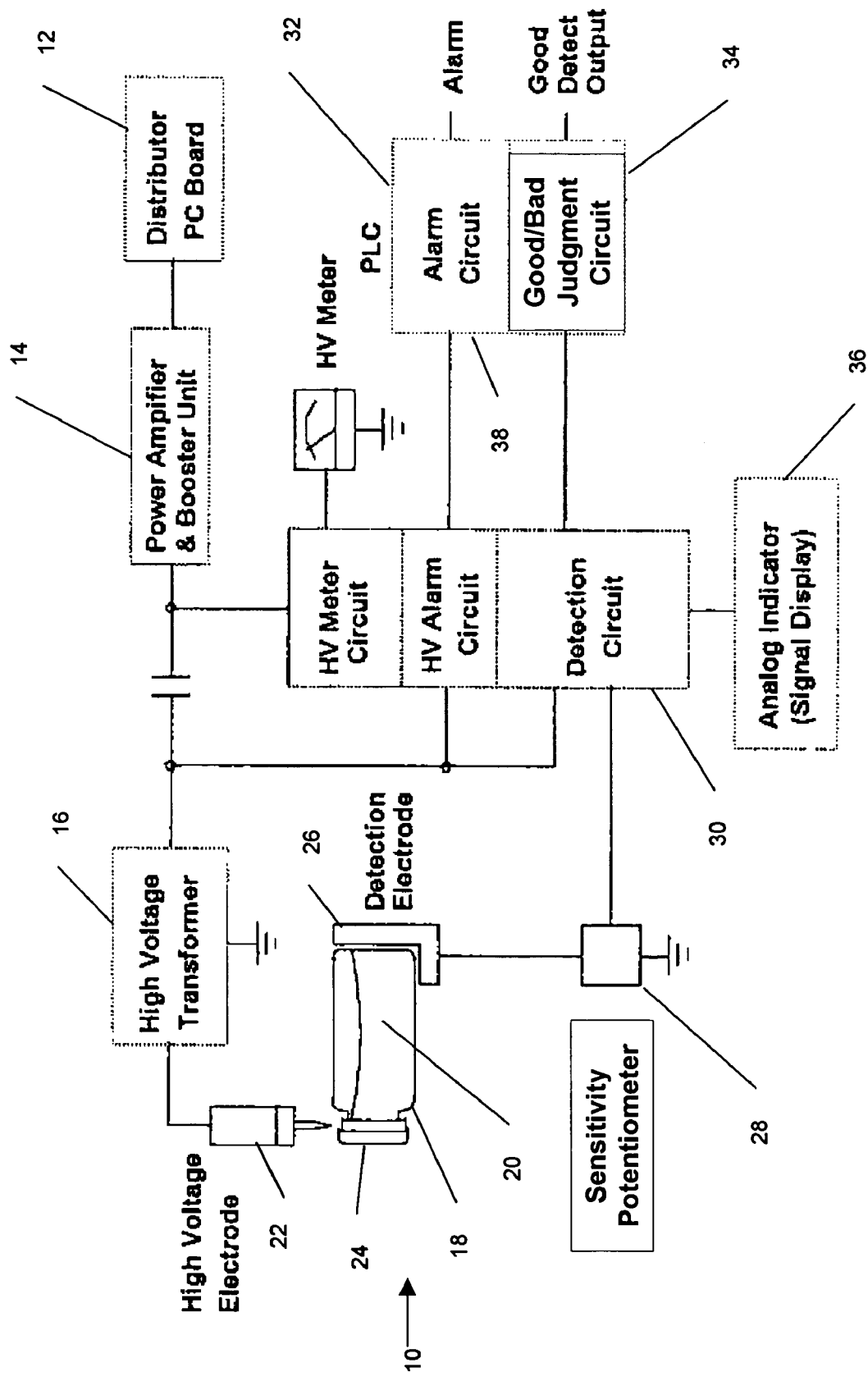
FIG. 1 is a schematic block diagram of a prior art high voltage spark test leak detection system wherein an inspection electrode tests for leakage above the hermetically sealed area end cap of a vial container.

Referring now to the drawings, there is shown in FIG. 1 a schematic block diagram of a prior art high voltage spark-test leak detection system 10. A high frequency high voltage is generated at a control section that includes a distributor PC board 12, a power amplifier and booster unit 14, and a high voltage transformer 16. The high voltage is applied to an electrically insulated vial container 18 having a conductive solution 20 therein through an inspection electrode 22 located above the vial container 18. The inspection electrode 22 tests for leakage at the hermetically sealed area end cap 24 of vial container 18. The current flow through the vial container 18 and solution 20 is collected at the detection electrode 26. The current volume is regulated by a sensitivity potentiometer 28 having settings to determine the signal amplitude to a detection circuit 30 where the signals are converted to DC voltage and set into a programmable logic controller 32 for reading and judgment circuit 34 determination. The converted signal can be displayed on an analog LED array or a digital signal display screen 36. If vial container 18 should have a leak at the tested seal area, a discharge current would flow through the pinhole, hairline cracks, or defective seal into the container 18. The change of electric current volume enables the presence of a defect to be recognized. When a leak is present there will be an electric discharge into the container and the container will have an increased electric current volume. With a constant voltage being applied to the container, a defective container will have a larger electric current volume than a container with no leak present. The programmable logic controller 32 can be used to activate an alarm circuit 38 or reject signals and other output signals for general operation.

Figure 2:
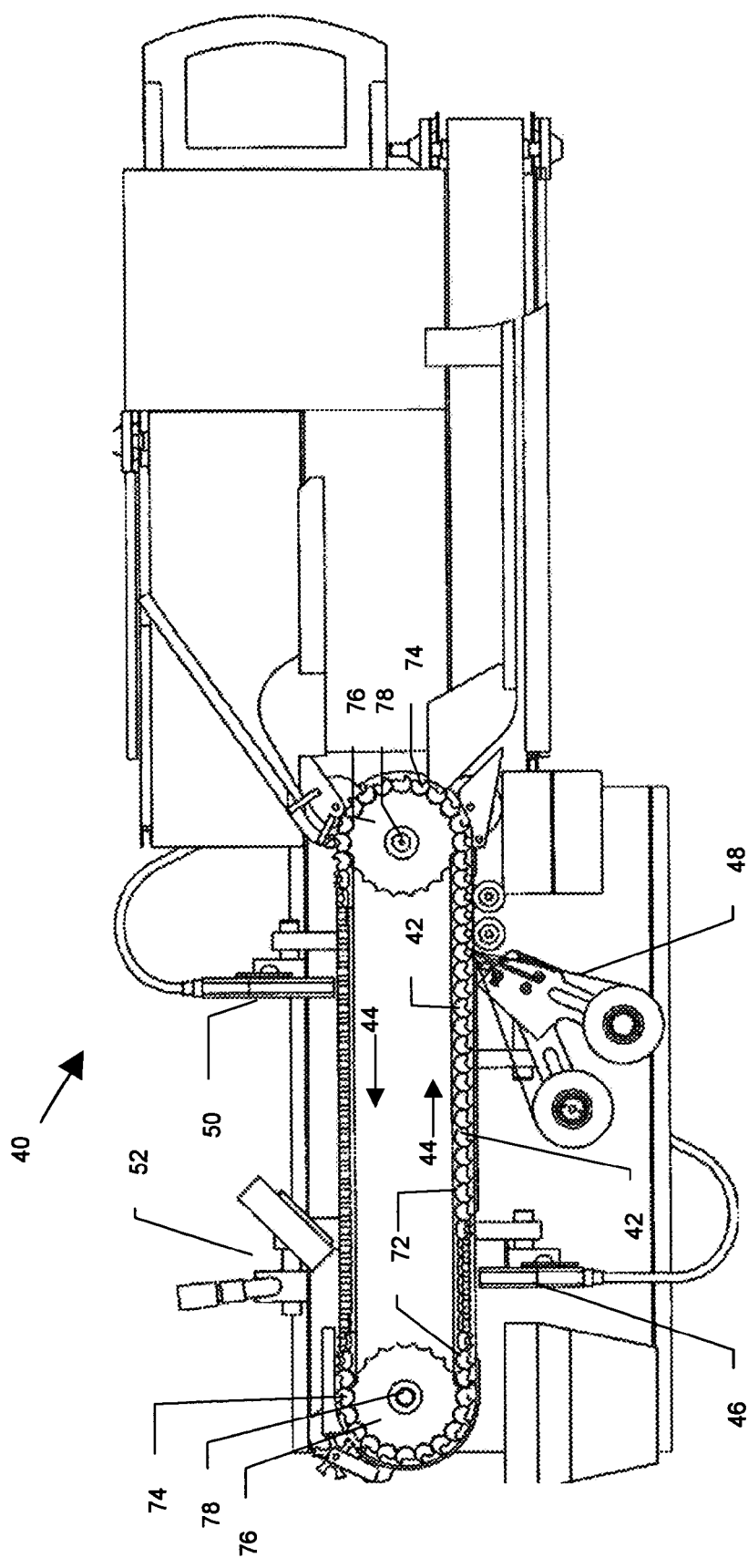
FIG. 2 is top perspective view of a prior art assembly line system in which carriers are conveyed in a desired direction of travel, in use, along an assembly line to multiple workstations in order to perform work operations on things merged with the carriers.

The prior art high speed assembly line system 40 of U.S. Pat. No. 6,293,387 to Forster is illustrated at FIG. 2 wherein a plurality of line feed carriers 42 are conveyed in a desired loop direction 44 of travel, in use, along an assembly line to multiple workstations 46, 48, 50, and 52 in order to perform work operations on work piece things, such as vials, merged with the carriers. For ease of illustration, the work piece vials are not shown merged with the carriers at FIG. 2.

Figure 3:
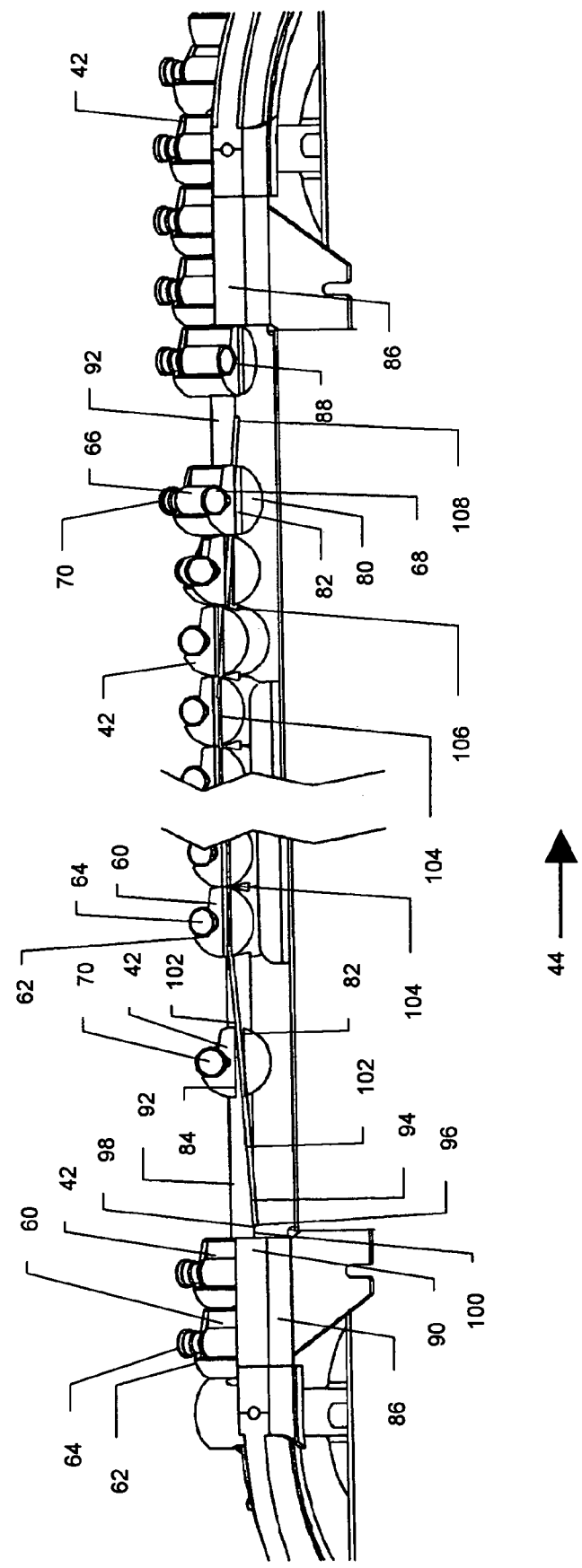
FIG. 3 is a side perspective view of a portion of the prior art assembly line system shown in FIG. 2 in which conveyed carriers are specifically orientated to allow for both linear motion of the carriers and rotation of the carriers on their horizontal axis in a direction perpendicular to their pathway travel.

FIG. 3 illustrates a portion of the prior art assembly line system 40 in which conveyed carriers 42 are specifically orientated to allow for both linear motion of the carriers and rotation of the carriers on their horizontal axis in a direction perpendicular to their pathway travel. Although the carriers 42 may be of various embodiments as illustrated in U.S. Pat. No. 6,293,387, at FIG. 3 a first side periphery 60 of the carrier 42 defines and provides a transport section 62 which is adapted to receive and convey a thing to be transported, such as a vial 64, so that multiple surfaces of the vial, such a side 66, bottom 68, and top surface 70, can be exposed to workstation or other carrier assembly line system processing. As noted at FIG. 2, a second side periphery 72 of the carriers provide a drive control section 74 adapted to engage a sprocket wheel 76 powered by a drive mechanism 78 to cause movement of a carrier array upon the assembly pathway. Preferably, a plurality of sprocket wheels operative by a drive mechanism provides a loop motion 44 to the carrier array.

As observed at FIG. 3, and as also explained in greater detail in U.S. Pat. No. 6,293,387 to Forster, the prior art carrier assembly line system 40 also includes structure for specifically orientating and rotating the carrier to allow for both linear movement of the carriers and rotation of the carriers on its horizontal axis in a direction perpendicular to its pathway travel. This structure includes the carriers having a bottom surface 80 intersected by a traverse slot 82 upwardly communicative with a traverse through bore 84. As each carrier 42 in a feed line of carriers moves along the desired pathway 44 by means of its drive control section 74, a guide element 86 as discussed in U.S. Pat. No. 6,293,387, such as a rail 88, boundary barrier 90, or rod 92, allows for linear movement of the carriers on the desired pathway.

As illustrated at FIG. 3, the linear movement of the carriers 42 in a desired pathway 44 may be accompanied by a controlled rotational orientation of the carriers along their horizontal axis perpendicular to the pathway. This is achieved when a rod 92 having a cam 94, such as cam rail 96, engages the traverse through bore 84 of carrier 42. In particular rod 92 is integral with an extended cam rail 96 upon the rod's external surface. The extended cam rail 96 has an initial engagement portion 98 extending downwardly from the bottom-most surface 100 of rod 92 which is suitable to engage the traverse slot 82 of carriers 42 while the rod 84 engages the traverse through bore 84 of such carriers. When carriers 42 move along the initial engagement portion 98 of the extended cam rail 96 they necessarily move forward in a linear stabilized direction. However, once the extended cam rail 96 begins to be circumferentially displaced and deviated from its initial engagement portion 98 position extending downwardly from the bottom-most surface 100 of rod 92 to a second displaced portion 102 of the cam rail 96, the carrier 42 necessarily rotates about its horizontal axis circumferentially upon the rod in a direction perpendicular to its ongoing linear motion in a precise controlled rotational orientation of the carrier such that vial 64 merged in the transport section thereof is likewise rotated to be upwardly disposed to a degree corresponding to the controlled degree of displacement of the second displaced portion 102 of the cam rail 96 from its initial engagement portion 98. The greater the degree of circumferential displacement of the second displaced portion 102 of extended cam rail 96 from the initial engagement portion 98, the greater is the degree of controlled rotation of the carrier and its merged work piece perpendicular to its ongoing linear motion. A third stabilization portion 104 of the extended cam rail 96 maintains a selected desired degree of carrier rotation along a segment of the desired pathway 96 suitable for workstation interaction or desired function of an assembly carrier line system. Carriers 42 are then returned to their initial feed orientation in a cam rail manner reversing the rotation and orientation, namely, as observed in FIG. 3, by passage of the carrier on return displaced portion 106 of extended cam rail 96 to disengagement portion 108 of extended cam rail 96.

Figure 7:
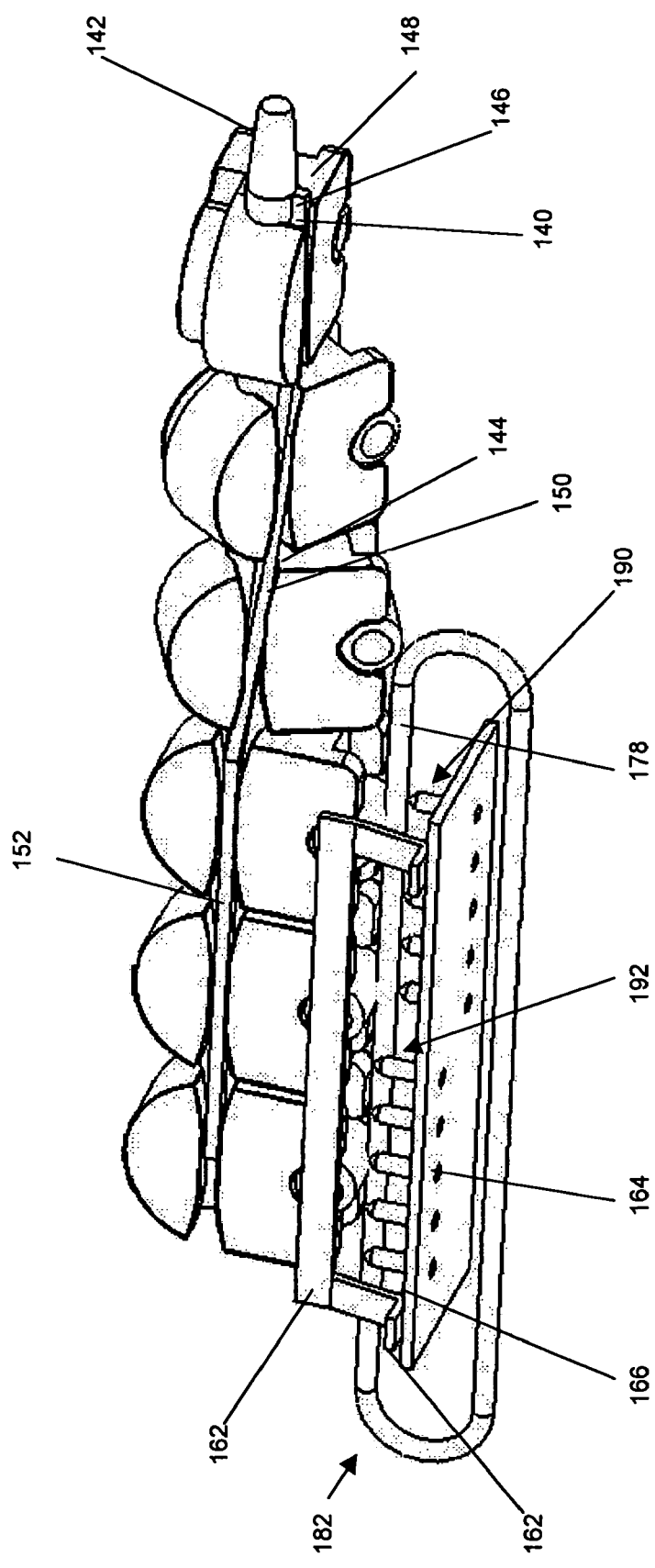
FIG. 7 is a rear perspective view of the FIG. 4 plurality of carriers being conveyed in a desired direction of travel, in use, along an assembly line to a high voltage spark test leak detection system workstation and shows the controlled rotational orientation of the carriers achieving a substantially horizontal and downwardly disposed orientation of its merged work piece vials by virtue of a cam rail upon a guide rod being located to the inside periphery of the carriers' pathway.

Thus, feed line carrier movement along a desired pathway may be provided with a controlled rotational orientation of the carriers perpendicular to the pathway so as to expose a work piece container merged with the carrier in a longitudinal orientation to a workstation. In the prior art FIG. 3, the extended cam rail 96 upon rod 92 is located on the outside periphery of the oval pathway loop illustrated at FIG. 2, thus causing the controlled rotational orientation of the carrier 42 to upwardly dispose its merged work piece vials. In the present invention, as later discussed in regard tot FIG. 7, the controlled rotational orientation of the carrier will be in the opposite direction due to the cam rail upon the rod being located to the inside periphery of the carriers' pathway so as to downwardly dispose its merged work piece vials.

In FIGS. 4 through 8 there is illustrated a preferred embodiment of the present invention, namely a carrier line orientated spin high voltage spark-test detection assembly and a method of leak detection testing incorporated therein.

Figure 4:
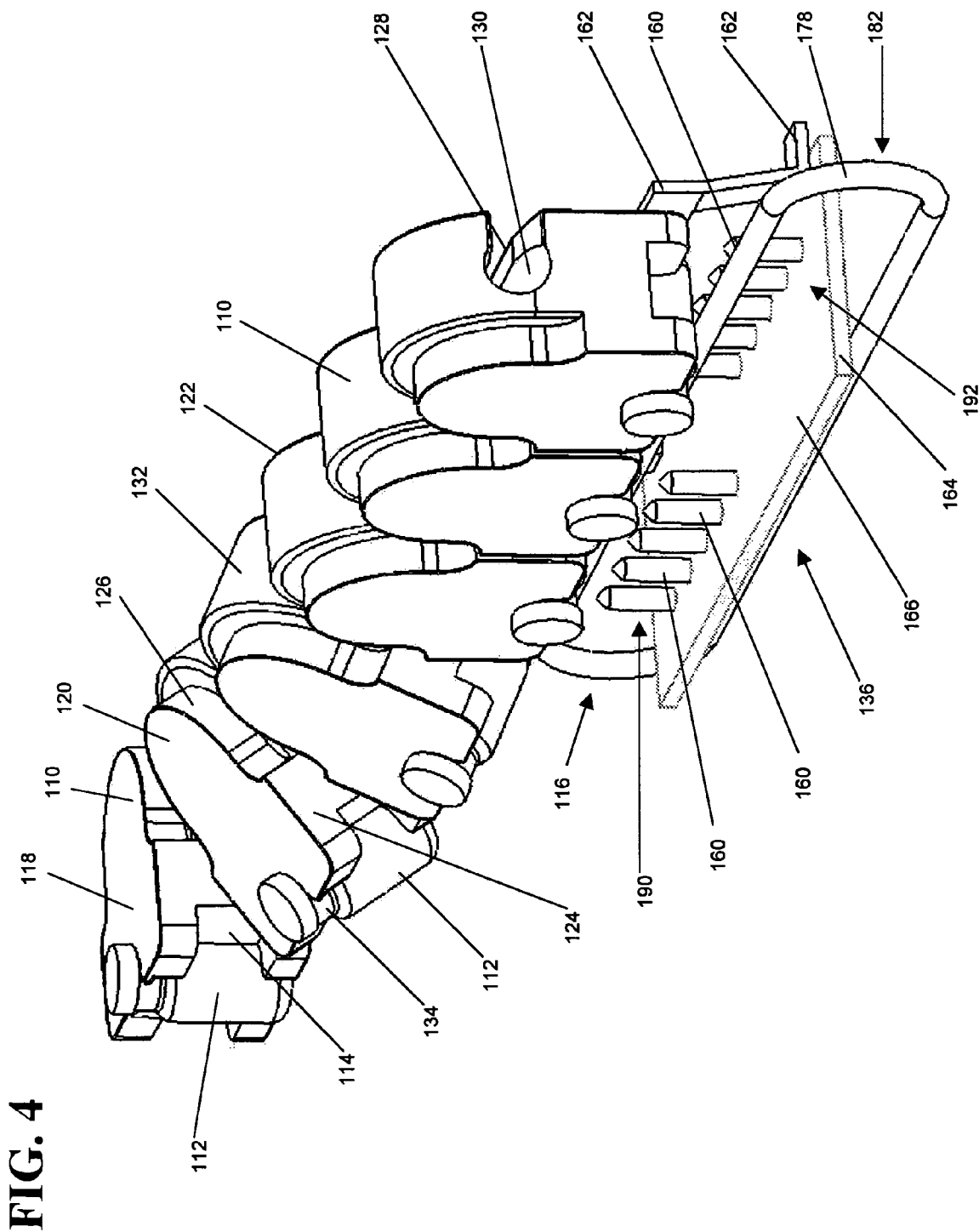
FIG. 4 is a front view of a preferred embodiment of the present invention showing a plurality of carriers being conveyed in a desired direction of travel, in use, along an assembly line to a high voltage spark test leak detection system workstation in order to inspect and detect leaks of a vial container merged with the carrier.
Figure 5:
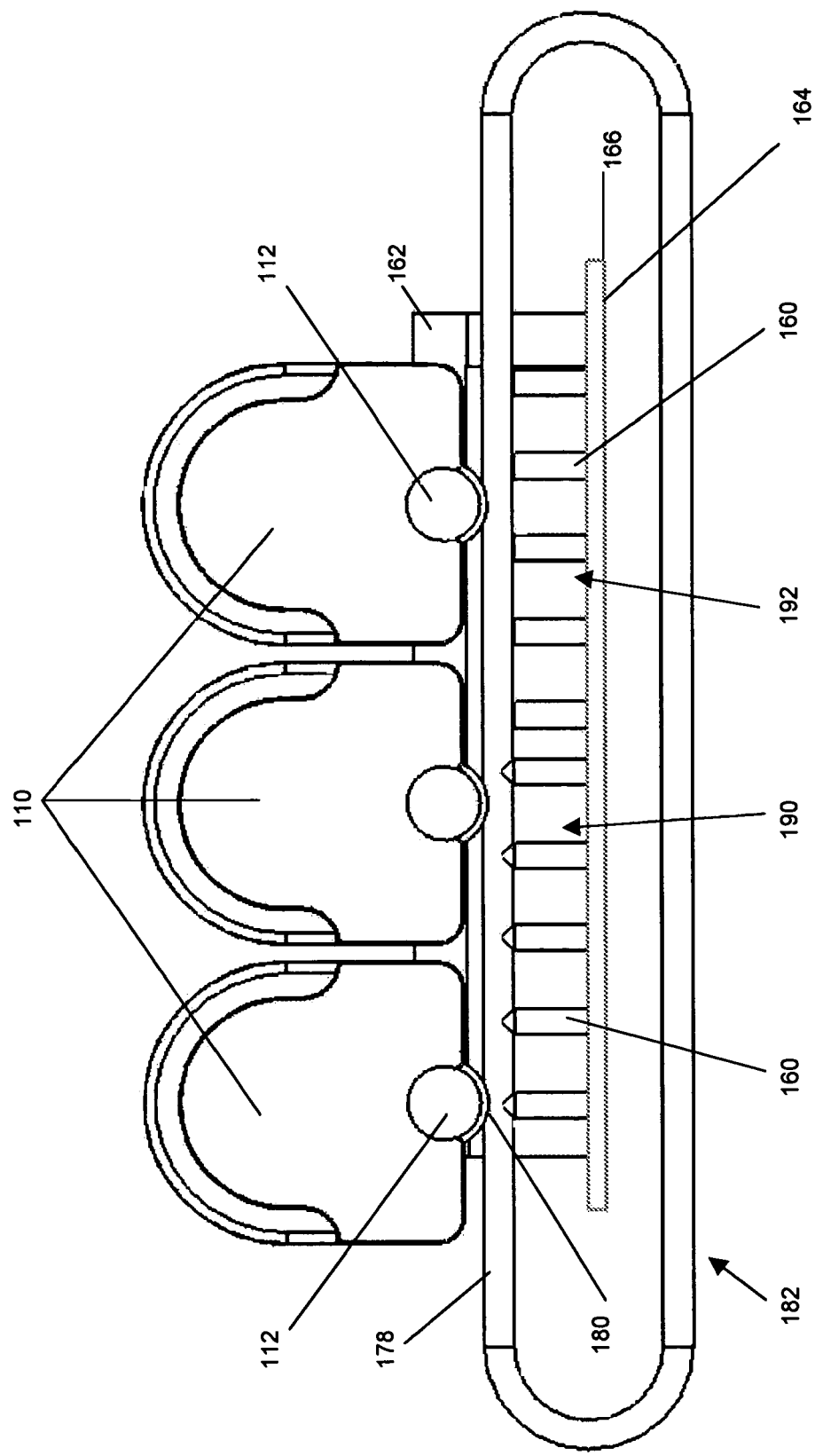
FIG. 5 is a front view of the pathway travel of the plurality of carriers of FIG. 4 to and through a high voltage leak spark test detection system workstation and shows the carriers' vials circumferentially rotated to a horizontal orientation downwardly disposing the vials to an array of inspection electrodes.

FIG. 4 is a front view of a plurality of carriers being conveyed in a desired direction of travel, in use, along an assembly line to a high voltage spark-test leak detection workstation in order to inspect and detection leaks of a vial container merged with the carrier. A plurality of carriers 110 each hold a container vial 112 within the carriers' transport section 114 for conveyance of the containers along an assembly line pathway 116 (the pathway structure, which may be in accordance with the teaching of U.S. Pat. No. 6,293,387 to Forster, is not shown at FIGS. 4 through 7 for ease and clarity of illustration of the present invention). The carriers 110 conveying the containers 112 comprise a body 118 having a top surface 120, a bottom surface 122, a first side periphery 124, a second side periphery 126, a traverse slot 128, and a traverse through bore 130, the bottom surface 122 being intersected by the traverse slot 128, the traverse slot being upwardly communicative with the traverse through bore 130, the first side periphery 124 or the top surface 120 providing a transport section 114 adapted to receive, convey, and orientate the container 112 to be transported, and the second side periphery 126 providing a drive control section 132 cooperative with a drive means. The transport section 114 of the carrier includes a hold area 134 forming a border or overhang of the first side periphery to engage at least a portion of container transported. The drive means for moving the carriers along the pathway 116 may include, as discussed later in reference to FIG. 8, at least one sprocket wheel operative by a drive mechanism cooperative with the drive control section 132 of the carriers to cause movement of said carriers upon the pathway 116. Preferably the drive means includes a plurality of sprocket wheels operative by a drive mechanism to provide a loop motion to a plurality of carriers.

As the carriers approach high voltage spark test leak detection workstation 136 the linear movement of the carriers along the assembly line pathway is accompanied by a rotation of the carrier circumferentially in a direction perpendicular to its linear direction of travel. As best illustrated at the rear perspective view of FIG. 7, a controlled rotational orientation of the carriers 110 to a substantially horizontal and downwardly disposed orientation of its merged work piece container vials 112 is achieved by virtue of a cam element 140 upon a pathway guide rod 142 being located to the inside periphery of the carriers' pathway. When approaching the high voltage spark test leak detection system workstation 136, the pathway guide rod 142 engages into the traverse through bore 130 of the carriers 110. The pathway guide rod 142 includes a cam element 140, such as extended cam rail 144 to engage the traverse slot 128 of the carrier 110 at initial engagement portion 146 of the extended cam rail 144. The carriers 110 are then rotated circumferentially upon the pathway guide rod 142 in a direction perpendicular to the carriers' linear direction of travel along at least a portion of the length of the rod 142 in a manner similar to the rotation discussed in relation to FIG. 3. In this regard, when the carriers 110 move along the initial engagement portion 146 of the extended cam rail 144 they necessarily move forward in a linear stabilized direction. However, once the extended cam rail 144 begins to be circumferentially displaced and deviated from its initial engagement portion 146 position extending downwardly from the bottom-most surface 148 of pathway guide rod 142 to a second displaced portion 150 of the extended cam rail 144, the carriers 110 necessarily begin to rotate about their horizontal axis circumferentially upon the rod in a direction perpendicular to its ongoing linear motion in a precisely controlled rotation. When carriers 110 reach a third stabilization portion 152 of the extended cam rail 144 they are maintained at a selected desired degree of carrier rotation along a segment of the desired pathway suitable for workstation 136 interaction. During travel along the third stabilization portion 152 of the extended cam rail 144, the carriers 110 preferably dispose their container vials 112 in a substantially horizontal downwardly facing position for high voltage spark test leak detection as discussed below.

At FIG. 4 the high voltage spark test leak detection workstation 136 includes at least one, and preferably an aligned plurality, of inspection electrodes 160 and a detection electrode ground bar 162 that is operatively cooperative with the carrier 110 conveyed containers 112 at the workstation 136 to obtain an electric current volume reading from a conventional high voltage spark test leak detection system 164 as discussed in association with FIG. 1. For ease of illustration, FIGS. 4 through 7 show inspection electrodes 160 and a detection electrode ground bar 162 connected to an electrode mounting plate 166 which is operatively part of an un-illustrated remainder of a prior art high voltage spark test detection system.

Figure 6:
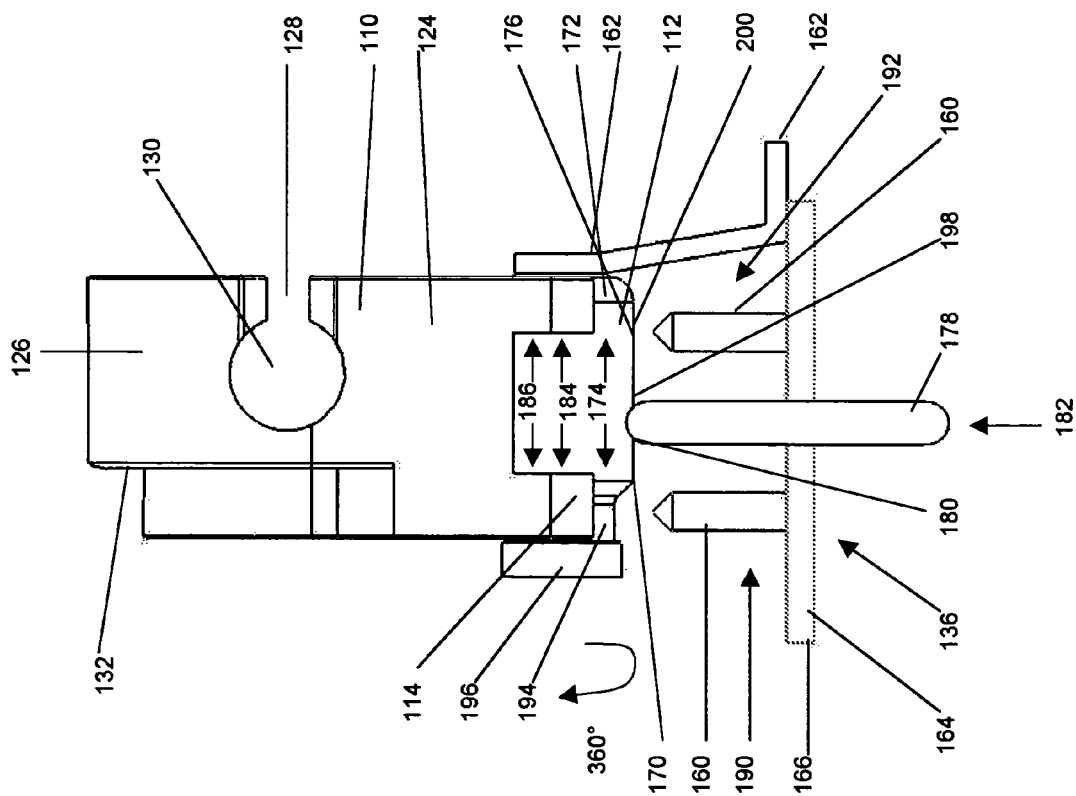
FIG. 6 is a downstream view of a carrier of FIG. 5 wherein the vial is circumferentially rotated from a prior vertical orientation to a horizontal orientation and shows a central portion of the underside circumference of a horizontally and downwardly disposed vial being spun rotated by a servo driven rotating roller or belt when exposed to successive arrays of inspection electrodes of a high voltage spark-test leak detection system located at left and right portions of the vial's underside circumference.

Referring now to FIG. 6, as carriers 110 arrive at the workstation 136, the carriers' container vial 112 has been circumferentially rotated from a prior vertical orientation to a substantially horizontal position so as to expose a portion of an external circumference 170 of the container 112 to an inspection electrode 160 and to expose a portion of the external surface 172 of the container to the detection electrode ground bar 162. In this orientation, the container 112 disposes its electrically conductive solution content along a longitudinal axis 174 of the container in contact with longitudinal portion of an internal circumference 176 of the container 112. A servo driven rotating roller or belt 178 comprised of a conventional and appropriately dimensioned assembly of belt, pulleys, and servo motor components known to those skilled in such art, is placed in abutment against an underside surface 180 of the external circumference 170 of the container 112 and serves as a drive means 182 to spin rotate the containers while so orientated, preferably in several 360 degree revolutions. The spin rotation of the container thus exposes successive longitudinal portions 184 and 186 of the internal circumference 176 of the container 112 in contact with the electrically conductive solution of the container for electric circuit volume reading by the high voltage spark test leak detection system 164. The exposure of a portion of the underside external circumference 170 of the container to an inspection electrode 160 located beneath the container combined with a 360 degree rotational span of the orientated container advantageously disposes the container's electrically conductive solution, regardless of any air pocket at the upper interior of the container, during the course of such spin, in contact with the entire internal circumference 176 of the container 112 during the electric current volume reading or multiple electric current volume readings of the high voltage spark test detection system 164 to detect pinholes, hairline cracks, capillary pores, or deficient seals throughout the container's interior circumference closed by the solution during the spin.

Preferably, the carrier line conveyance of the orientated containers and their spin exposes a variable portion of the container's external circumference to a plurality of inspection electrodes. In this regard, FIGS. 4 through 7, illustrate a first inspection electrode array 190 and a second electrode array 192 each comprised of five successively aligned electrodes 160 spaced approximately 10 ml apart for operative exposure, respectively, to differing portions of the container's external circumference. Specifically, first inspection electrode array 190 spark tests a first portion 194 of the containers' external circumference 170 proximal to the containers' hermetically sealed end cap 196. The linear conveyance of the carrier 112 along the pathway 116 at workstation 136 to each of the five inspection electrodes 160 of the first inspection electrode array 190 allows for multiple electric current volume readings of the high voltage spark test leak detection system 164. As best illustrated at FIG. 6, when the servo driven rotating roller or belt 178 is placed in spin contact against a central portion 198 of the underside surface of the external circumference 170 of the containers, such a placement allows for a second inspection electrode array 192, again comprised of five successively aligned electrodes spaced approximately 10 ml apart, to be operatively exposed to a second portion 200 of the containers' external circumference 170 now distal to the containers' hermetically sealed end cap 196 which can likewise accommodate multiple electric current volume readings of the high voltage spark test leak detection system 164 during the container's course of travel at workstation 136.

Figure 8:
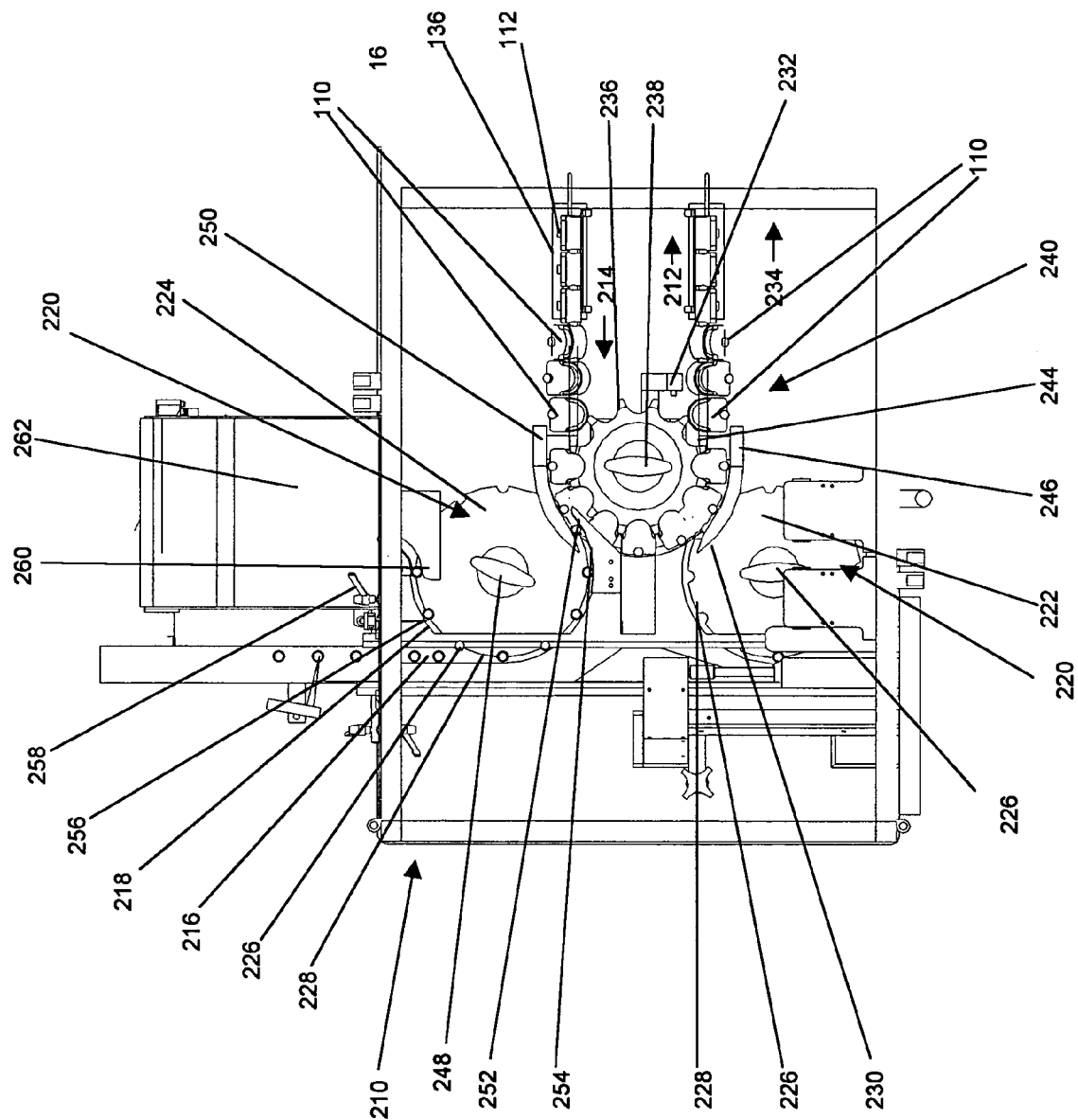
FIG. 8 is top perspective view of a preferred embodiment of the present invention, namely a partial, left side, portion of an assembly line system in which plurality of carriers in feed with vial containers are conveyed in a desired looped direction of travel, in use, along the assembly line to a high voltage spark test leak detection system workstation in order to inspect and detect leaks of a vial container merged with the carrier, and shows, depending on the inspection results, an acceptable vial processing path and a rejected vial processing path.

The foregoing aspects of the present invention can be viewed in the assembly line system of FIG. 8 which is a top perspective view of a partial, left side, portion of an assembly line system 210 in which a plurality of carriers 110 in feed with vial containers are conveyed in a desired looped direction of travel 212 and 214, in use, along the assembly line to a high voltage spark test leak detection system workstation 136 in order to inspect and detect leaks of a vial container 112 merged with the carriers. FIG. 8 also shows, depending on the inspection results, an acceptable vial processing path 216 and a rejected vial processing path 218. Assembly line system 210 includes a transfer assembly 220 having a pair of sprocket wheels, including vial in-feed sprocket wheel 222 and vial discharge sprocket wheel 224, for directing the flow of feeding, discharge, or rejection of the container vials 112 that are carrier transported upon the assembly line pathway. The vial in-feed sprocket wheel 222 and vial discharge sprocket wheel 224 each have a plurality of reception pockets 226 defined between teeth 228 of the sprocket wheels suited to, respectively, in-feed convey and discharge receive container vials 112 to and from the carrier's transport section 114. The vial in-feed sprocket wheel 222 operative by drive mechanism 226 provide container vials 112 to carrier 110 via in-feed dislodge finger 230 after the carriers have been sequentially logged and accounted for by sensor 232 communicative with a programmable logic controller. Once feed with a container vial 112, carrier 110 travels upon pathway 234 by pathway sprocket wheel 236 feed line advancement operative by pathway drive mechanism 238 that provides motion to the plurality of carriers. The pathway 234 travel is guided by a guide element 240 cooperative with the carrier 110 selected from one or more of the group consisting of a rail 242 for engagement into the traverse slot 128 of the carrier 110, a guide rod 244 for engagement into the traverse through bore 130 of the carrier 110, and a boundary barrier 246 to contain the carrier 110. After processing of the carrier's container vial 112 work piece at outward travel direction 212 workstations, a return sprocket wheel radial reversal of the pathway (not illustrated at FIG. 8) directs the carriers in direction 214 to high voltage spark test leak detection system workstation 136 as discussed previously herein. After good/bad judgment circuit 34 has logged and accounted for the electric current volume reading by the high voltage spark-test leak detection system 164 per programmable logic controller 32, carriers 110 are feed line sequentially feed to vial discharge sprocket wheel 224 operative by discharge sprocket wheel drive mechanism 248. Barrier wall 250 then directs tested container vials 112 for interaction with a discharge dislodge finger 252 that separates the container vials 112 from carriers 110 for travel along a discharge sprocket wheel 224 process path 254. As identified and accounted for programmable logic controller 32, good judgment leak tested vials proceed to acceptable vial processing path 216 for subsequent package processing and bad judgment leak tested vials continue to rejected vial processing path 218 for passage across a quality control/accounting sensor laser beam 256 of rejection control sensor 258 before rejection dislodgment finger 260 separation to rejection tray 262.

The foregoing description of the carrier line orientated spin high voltage spark test leak detection assembly of the present invention also incorporates and describes a method for leak detection inspection of electrically insulated containers having an electrically conductive solution therein that are merged with complimentary assembly line carriers. In particular, the method comprising the steps of: (a) conveying a plurality of carriers upon an assembly line pathway to transport the containers to a high voltage leak detection inspection system workstation, (b) orientating the containers at the workstation so as to dispose the solution along a longitudinal axis of the containers in contact with a longitudinal portion of an internal circumference of the containers, to expose a portion of an external circumference of the containers to an inspection electrode of a high voltage leak detection system, and to expose a portion of an external surface of the containers to a detection electrode of a high voltage leak detection system, and (c) spinning the containers while so orientated to expose successive longitudinal portions of the internal circumference of the containers in contact with the electrically conductive solution of the containers for electric current volume reading by the high voltage spark-test leak detection system.

From the foregoing description, it will be apparent that the carrier line orientated spin high voltage leak detection system and method of the present invention has a number of advantages, some of which have been described above and others of which are inherent in the invention. Also, it will be understood that modifications can be made to the carrier line orientated spin high voltage leak detection system and testing method of the present invention or its environment of use described above without departing from the teachings of the present invention. For example, the number and pathway positioning of the inspection and detection electrodes relative to the tested container may vary as well as the type, positioning, and dimension of the rotating roller or belt placed in contact against an underside surface of the external circumference of the container. Further, the physical form of the container carriers and the composite structural assembly and positioning of the high voltage spark test leak detection system employed to obtain electric current volume readings may likewise vary without departing form the scope of the present invention. Accordingly, the scope of the invention is only to be limited as necessitated by the accompanying claims.

I claim:

1. A method for assembly line pathway high voltage spark test leak detection inspection of electrically insulated containers having an electrically conductive solution therein, said containers being merged with complimentary assembly line carriers, comprising the steps of:

conveying a plurality of carriers upon an assembly line pathway to transport said containers to a high voltage spark test leak detection system workstation, orientating said containers at said workstation so as to dispose said solution along a longitudinal axis of said containers in contact with a longitudinal portion of an internal circumference of said containers, to expose a portion of an external circumference of said containers to an inspection electrode of a high voltage spark test leak detection system, and to expose a portion of an external surface of said containers to a detection electrode of a high voltage spark test leak detection system, and spinning said containers while so orientated to expose successive longitudinal portions of said internal circumference of said containers in contact with said electrically conductive solution of said containers for electric current volume reading by said high voltage spark-test leak detection system.

2. The method according to claim 1 wherein said orientation step disposes said containers in a substantially horizontal position.

3. The method according to claim 1 wherein said orientation step exposes an underside surface of the external circumference of said containers to said inspection electrode located beneath said container.

4. The method according to claim 1 wherein said spinning step is performed by means of a rotating roller or belt that is placed in abutment against an underside surface of the external circumference of said containers.

5. The method according to claim 4 wherein said rotating roller or belt that is placed in abutment against an underside surface of the external circumference of said containers contacts such container at a central portion thereof.

6. The method according to claim 1 wherein said spinning step rotates said containers 360 degrees.

7. The method according to claim 6 wherein said orientation and spinning steps disposes said electrically conductive solution during the course of such spin in contact with the entire internal circumference of said containers.

8. The method according to claim 1 wherein said spinning step allows for multiple electric current volume readings of the container by said high voltage spark-test leak detection system workstation.

9. The method according to claim 1 wherein said conveying step provides a plurality of carriers upon said assembly line pathway, each of said carriers comprising a body having a top surface, a bottom surface, a first side periphery, a second side periphery, a traverse slot, and a traverse through bore, said bottom surface being intersected by said traverse slot, said traverse slot being upwardly communicative with said traverse through bore, said first side periphery or said top surface providing a transport section adapted to receive and convey said thing to be transported, and said second side periphery providing a drive control section suited to engage a sprocket mechanism operatively connected to a drive mechanism.

10. The method according to claim 9 wherein said conveying step moves said carriers along said pathway with a pathway guide element cooperative with said carriers, said pathway guide element being selected from one or more of the group consisting of a rail for engagement into said traverse slot of said carrier, a rod for engagement into said traverse through bore of said carrier, and a boundary barrier to contain said carriers.

11. A carrier line orientated spin high voltage spark test leak detection assembly in which carriers are conveyed, in use, to a high voltage spark-test leak detection system workstation in order to perform testing on electrically insulated containers having a conductive solution therein merged with said carriers, comprising:

a plurality of carriers for conveying said containers, a pathway having a guide element cooperative with said carriers, drive means for moving said carriers along said pathway to said high voltage spark-test leak detection system workstation, a high voltage spark test leak detection system having an inspection electrode and a detection electrode operatively cooperative with said containers at said workstation to obtain an electric current volume reading, means for orientating said carriers at said workstation to dispose said solution along a longitudinal axis of said containers in contact with a longitudinal portion of an internal circumference of said containers, to expose a portion of an external circumference of said containers to said inspection electrode of a high voltage spark-test leak detection system, and to expose a portion of an external surface of said containers to said detection electrode of a high voltage spark test leak detection system, and means for spinning said containers while so orientated to expose successive longitudinal portions of said internal circumference of said containers in contact with said electrically conductive solution of said containers for electric current volume reading by said high voltage spark test leak detection system.

12. The carrier line orientated spin high voltage spark test leak detection assembly of claim 11 wherein said carriers for conveying said containers comprise a body having a top surface, a bottom surface, a first side periphery, a second side periphery, a traverse slot, and a traverse through bore, said bottom surface being intersected by said traverse slot, said traverse slot being upwardly communicative with said traverse through bore, said first side periphery or said top surface providing a transport section adapted to receive, convey, and orientate said container to be transported, and said second side periphery providing a drive control section cooperative with said drive means.

13. The carrier line orientated spin high voltage spark test leak detection assembly of claim 12 wherein said first side periphery or said top surface providing a transport section adapted to receive, convey, and orientate said container to be transported includes a hold area forming a border or overhang of said first side periphery to engage at least a portion of said container to be transported.

14. The carrier line orientated spin high voltage spark test leak detection assembly of claim 11 wherein said guide element is selected from one or more of the group consisting of a rail for engagement into said traverse slot of said carrier, a rod for engagement into said traverse through bore of said carrier, and a boundary barrier to contain said carriers.

15. The carrier line orientated spin high voltage spark test leak detection assembly of claim 14 wherein said means for orientating said carriers at said workstation comprises a rod having a cam element to make contact with said traverse slot of said carrier and to rotate said carrier circumferentially upon said rod in a direction perpendicular to its linear direction of travel along at least a portion of the length of said rod.

16. The carrier line orientated spin high voltage spark test leak detection assembly of claim 11 wherein said drive means for moving said carriers along said pathway to said high voltage spark test leak detection system workstation comprises at least one sprocket wheel operative by a drive mechanism that is cooperative with said drive control section of said carriers to cause movement of said carriers upon said pathway.

17. The carrier line orientated spin high voltage spark test leak detection assembly of claim 16 wherein said drive means for moving said carriers along said pathway comprises a plurality of sprocket wheels operative by a drive mechanism to provide a loop motion to a plurality of said carriers.

18. The carrier line orientated spin high voltage spark test leak detection assembly of claim 17 wherein said means for spinning said containers while so orientated comprises a rotating roller or belt that is placed in abutment against an underside surface of the external circumference of said containers.

19. The carrier line orientated spin high voltage spark test leak detection assembly of claim 18 wherein said rotating roller or belt that is placed in abutment against an underside surface of the external circumference of said containers contacts such container at a central portion thereof.

20. The carrier line orientated spin high voltage spark test leak detection assembly of claim 18 wherein said rotating roller or belt rotates said containers 360 degrees.

21. The carrier line orientated spin high voltage spark test leak detection assembly of claim 11 wherein said electrically conductive solution during the course of such spin contacts the entire internal circumference of said containers.

22. The carrier line orientated spin high voltage spark test leak detection assembly of claim 11 further including a transfer assembly having a sprocket wheel operative by a drive mechanism that is cooperative with said carriers for the feeding, or discharge, or rejection of the containers to be transported by said carriers.

* * * * *